United States Patent
Nazmy et al.

(10) Patent No.: US 8,007,715 B2
(45) Date of Patent: Aug. 30, 2011

(54) WELDING ADDITIVE MATERIAL

(75) Inventors: Mohamed Nazmy, Fislisbach (CH);
Paul Claus Gerdes, Baden-Rütihof (CH); Andreas Kuenzler, Baden (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 12/704,973

(22) Filed: Feb. 12, 2010

(65) Prior Publication Data
US 2010/0206937 A1 Aug. 19, 2010

(30) Foreign Application Priority Data
Feb. 19, 2009 (CH) ..................... 00255/09

(51) Int. Cl.
*C22C 38/44* (2006.01)
*C22C 38/46* (2006.01)
(52) U.S. Cl. .............. 420/69; 420/35; 420/70; 420/109; 148/325; 148/335; 148/529
(58) Field of Classification Search ............ 420/35, 420/67, 70, 109, 69; 148/325, 335, 334, 148/529
See application file for complete search history.

(56) References Cited

U.S. PATENT DOCUMENTS
5,779,821 A * 7/1998 Ishii et al. ............ 148/326
2010/0040502 A1 * 2/2010 Nazmy et al. ............ 420/40

FOREIGN PATENT DOCUMENTS
| EP | 0976844 | 2/2000 |
| EP | 1347073 | 9/2003 |
| JP | 6-306550 | 11/1994 |
| WO | WO 2008119638 | * 10/2008 |

OTHER PUBLICATIONS

Lieferanweisung fuer Schweisszusatzwerkstoffe: Boehler SZW 3001-UP, 2001, 1 pg, ALSTOM (Schweiz) AG.
Search Report for Swiss Patent App. No. 00255/2009 (May 5, 2009).

* cited by examiner

*Primary Examiner* — Deborah Yee
(74) *Attorney, Agent, or Firm* — Cermak Nakajima LLP; Adam J. Cermak

(57) ABSTRACT

A steel has the following chemical composition (amounts in % by weight):
0.05-0.14 C,
8-13 Cr,
1-2.6 Ni,
0.5-1.9 Mo,
0.5-1.5 Mn,
0.15-0.5 Si,
0.2-0.4 V,
0-0.04 B,
2.1-4.0 Re,
0-0.07 Ta,
0-60 ppm Pd,
remainder Fe and unavoidable impurities.

The steel can be used effectively as a welding additive material and has outstanding properties at very high temperatures, in particular a good creep rupture strength/resistance and a good oxidation resistance.

17 Claims, 3 Drawing Sheets

WELDING ADDITIVE MATERIAL

This application claims priority under 35 U.S.C. §119 to Swiss application No. 00255/09, filed 19 Feb. 2009, the entirety of which is incorporated by reference herein.

BACKGROUND

1. Field of Endeavor

The invention deals with the field of materials science. It relates to a steel-based welding additive material which is distinguished by improved meltability during welding and by a higher creep rupture strength after solidification than known welding additive materials.

2. Brief Description of the Related Art

It is known to produce rotors of thermal turbomachines, for example gas turbines, from individual disks which are then welded to each other. By way of example, this has been carried out by ABB, and then ALSTOM, for decades using an arc fusion welding process/submerged arc welding process.

The efficiency of gas turbines is increased, inter alia, by operating them at extremely high temperatures. Therefore, the rotors have to have both a high creep rupture strength at very high temperatures and also good further mechanical properties and a good oxidation resistance. It is self-evident that this also applies to the weld seams via which the rotor disks are connected to each other.

The use of a welding additive material having the following chemical composition (amounts in % by weight) is known from the prior art for the submerged arc welding of such gas turbine rotors:

0.09-0.14 C, max. 0.40 S, max. 1.40 Mn, max. 0.025 P, max. 0.020 S, max. 11.00-12.50 Cr, 2.00-2.60 Ni, 0.95-1.80 Mo, 0.20-0.35 V, 0.020-0.055 N, remainder iron.

This welding additive material is known by the name SZW 3001-UP. It is supplied as a wire, where the tensile strength of the wire is in the range from 700 to 1200 $N/mm^2$ and the permissible deviation of the strength within a batch may not be more than +/−50 $N/mm^2$. According to delivery conditions, this welding additive material is used for submerged arc joining welds and build-up welds.

However, this material no longer always satisfies the high demands of modern gas turbines, in particular with regard to high-temperature properties such as, for example, the creep rupture strength.

U.S. Pat. No. 5,906,791 discloses a boron and rare earth metal steel which is used for producing turbine components. It has very good physical and thermal properties, for example a high resistance to embrittlement, oxidation, and creep. In addition to the high chromium content (8-13% by weight Cr), this high-alloy steel also contains, inter alia, 0.001-0.04% by weight B, 0.01-2.00% by weight of at least one of the elements Re and Os, Ir, Ru, Rh, Pt, Pa (noble metals of the platinum group), and also 0.01-0.50% by weight of at least one rare earth metal, e.g., Y, La, C. In order to obtain a good toughness of the steel, it is desirable for this steel to contain, by way of example, as far as possible no more than 0.01% by weight Si and 0.05% by weight Mn, since this reduces the formation of segregations and second phases. In the indicated range, the rare earth metals reduce the aging embrittlement, while some, e.g., La, also reduce the formation of depositions. A prerequisite for this is a low level of impurities. Re and these metals of the platinum group act as elements for strengthening the solid solution. The latter additionally improve the oxidation resistance but disadvantageously increase the material costs.

SUMMARY

One of numerous aspects of the present invention is based on developing a steel-based, high-temperature-resistant welding additive material which is distinguished by improved meltability during welding and by a higher creep rupture strength after solidification than known welding additive materials.

Another aspect of the present invention includes a steel has the following chemical composition (amounts in % by weight):

0.05-0.14 C,
8-13 Cr,
1-2.6 Ni,
0.5-1.9 Mo,
0.5-1.5 Mn,
0.15-0.5 Si,
0.2-0.4 V,
0-0.04 B,
2.1-4.0 Re,
0-0.07 Ta,
O-max. 60 ppm Pd,
remainder Fe and unavoidable impurities.

Compared with the material SZW 3001, which has been known to date and used as a welding additive material, materials embodying principles of the present invention can be distinguished by increased creep rupture strengths and other good relevant mechanical properties, as well as by a good oxidation resistance. This can be attributed to the combination of the alloying constituents in the indicated ranges, in particular to the addition of Re in the indicated range and to the additional microalloying with B and Ta.

Re is an element which, in the indicated amounts of 2.1 to 4.0, preferably of 3.0% by weight, very readily contributes to the strengthening of the solid solution and thereby results in good strength values, in particular creep rupture strength values.

B is an element which, in the indicated amounts of up to max. 0.04, preferably 0.01% by weight, strengthens the grain boundaries. It additionally also stabilizes the carbides. Higher boron contents are critical since these may lead to undesirable depositions of boron which have an embrittling effect. The interaction between boron and the other constituents, in particular Ta (in the range of 0.01-0.07% by weight), results in good strength values, in particular during creeping.

Materials embodying principles of the present invention may contain up to 0.07, preferably 0.01% by weight Ta. Ta acts as an element for strengthening depositions and increases the high-temperature resistance. By contrast, if more than 0.07% by weight Ta is used, the oxidation resistance will disadvantageously be reduced.

Cr is a carbide-forming element which, in the indicated range of 8-13% by weight, preferably 12% by weight, increases the oxidation resistance; higher amounts of Cr lead to undesirable depositions which disadvantageously cause the material to become brittle.

Si is an element which, in the indicated range of 0.15-0.5% by weight, preferably 0.3-0.5% by weight, in particular 0.4% by weight, ensures that the steel has an improved meltability. When a steel embodying principles of the present invention is used as the welding additive material, the weld deposit therefore becomes more fluid and it is easier to carry out the welding. In addition, the oxidation resistance is increased; however, the addition of Si disadvantageously promotes the formation of undesirable, embrittling phases in steels.

Mn and Ni are austenite-stabilizing elements which, in the indicated ranges (1-2.6% by weight Ni and 0.5-1.5% by weight Mn, preferably 1% by weight Mn), increase the toughness of the steel.

Mo and V are likewise carbide-forming elements and, when added in the ranges described herein (0.5-1.9% by weight Mo, preferably 1.7% by weight Mo, 0.2-0.4% by weight V, preferably 0.35% by weight V), have a positive effect on the oxidation resistance.

Finally, even very small amounts of Pd (max. 60 ppm, preferably 50 ppm) can contribute to an increase in the strength (Pd is an element for strengthening the solid solution) and to an improvement in the oxidation resistance.

BRIEF DESCRIPTION OF THE DRAWINGS

The drawings show exemplary embodiments of the invention. In the drawings.

DETAILED DESCRIPTION OF EXEMPLARY EMBODIMENTS

In the text which follows, the invention will be explained in more detail with reference to exemplary embodiments and the drawings.

An investigation was carried out on the commercial alloy SZW 3001, which is known from the prior art, and on the test alloys SZWX1, SZWX2 and SZWX3; the chemical composition of these alloys in % by weight is indicated in table 1 ("Rem." indicates remainder).

TABLE 1

Chemical composition of the investigated alloys

| | Fe | Cr | Ni | Mn | Si | C | Mo | V | B | Re | Ta | Pd |
|---|---|---|---|---|---|---|---|---|---|---|---|---|
| SZW 3001 | Rem. | 12 | 2.3 | 1 | 0.4 | 0.12 | 1.7 | 0.35 | — | — | 0 | 0 |
| SZWX1 | Rem. | 12 | 2.3 | 1 | 0.4 | 0.12 | 1.7 | 0.35 | 0.01 | — | 0.01 | 0 |
| SZWX2 | Rem. | 12 | 1 | 1 | 0.4 | 0.12 | 1.7 | 0.35 | 0.01 | 3 | 0.01 | 0 |
| SZWX3 | Rem. | 12 | 2.3 | 1 | 0.4 | 0.12 | 1.7 | 0.35 | — | 3 | 0.01 | 50 ppm |

The alloys SZWX1, SZWX2 and SZWX3 were produced as follows.

They were melted several times in an arc furnace as blocks having a diameter of about 50 mm. They were subsequently subjected to stress-relief annealing (610° C./6 h/furnace cooling). Then, conventional tensile and creep specimens were produced therefrom.

Figure 1:
FIG. 1 shows the yield strength and tensile strength as bar charts for the alloys investigated.
Figure 2:
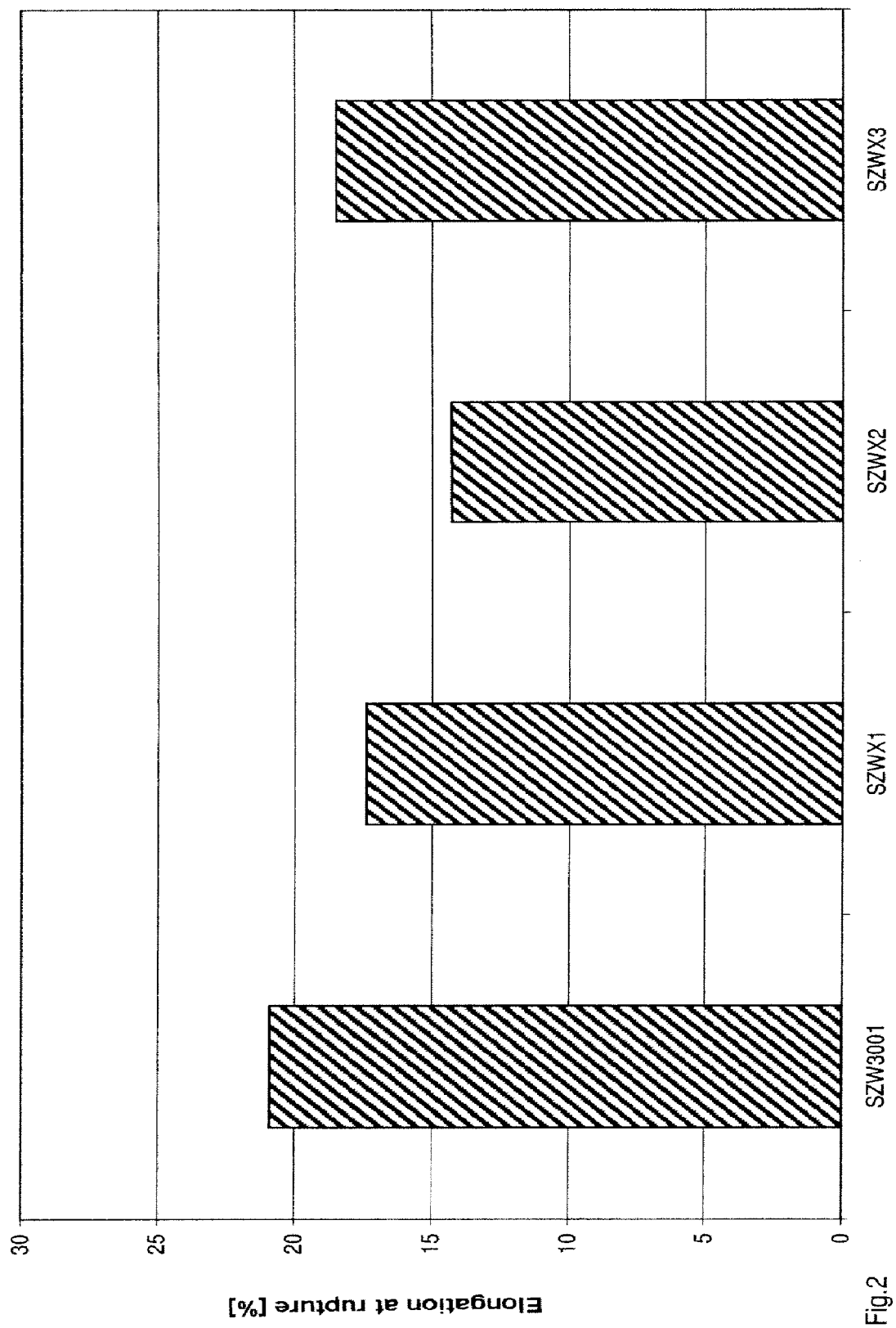
FIG. 2 shows the elongation at rupture as bar charts for the alloys investigated.

FIG. 1 and FIG. 2 show the results of the tensile tests at room temperature for the four different materials investigated.

FIG. 1 shows the yield strength (horizontal hatching) and tensile strength (diagonal hatching) as bar charts. It can clearly be seen that the alloy SZWX2 has greatly improved strength values compared to the previously used welding additive material SZW 3001. By way of example, the yield strength has risen from 914 to 970 MPa (an increase of about 6%) and the tensile strength has risen from 1147 to 1205 MPa (an increase of about 5%). This can be attributed to the interaction between all the alloying elements in the indicated range, but above all to the addition of Re, B and Ta. As shown in FIG. 1, the alloy SZWX3 investigated has the same strength values as the comparative alloy, even though the composition differs greatly in terms of Re, Ta, and Pd content.

FIG. 2 shows the determined elongation at rupture values. Although, as expected, there are slight impairments here to the elongation at rupture values, particularly in relation to the alloy SZWX2, compared to the known prior art, these are not serious for an intended use of the material, welding additive material for the welding of rotors.

Figure 3:
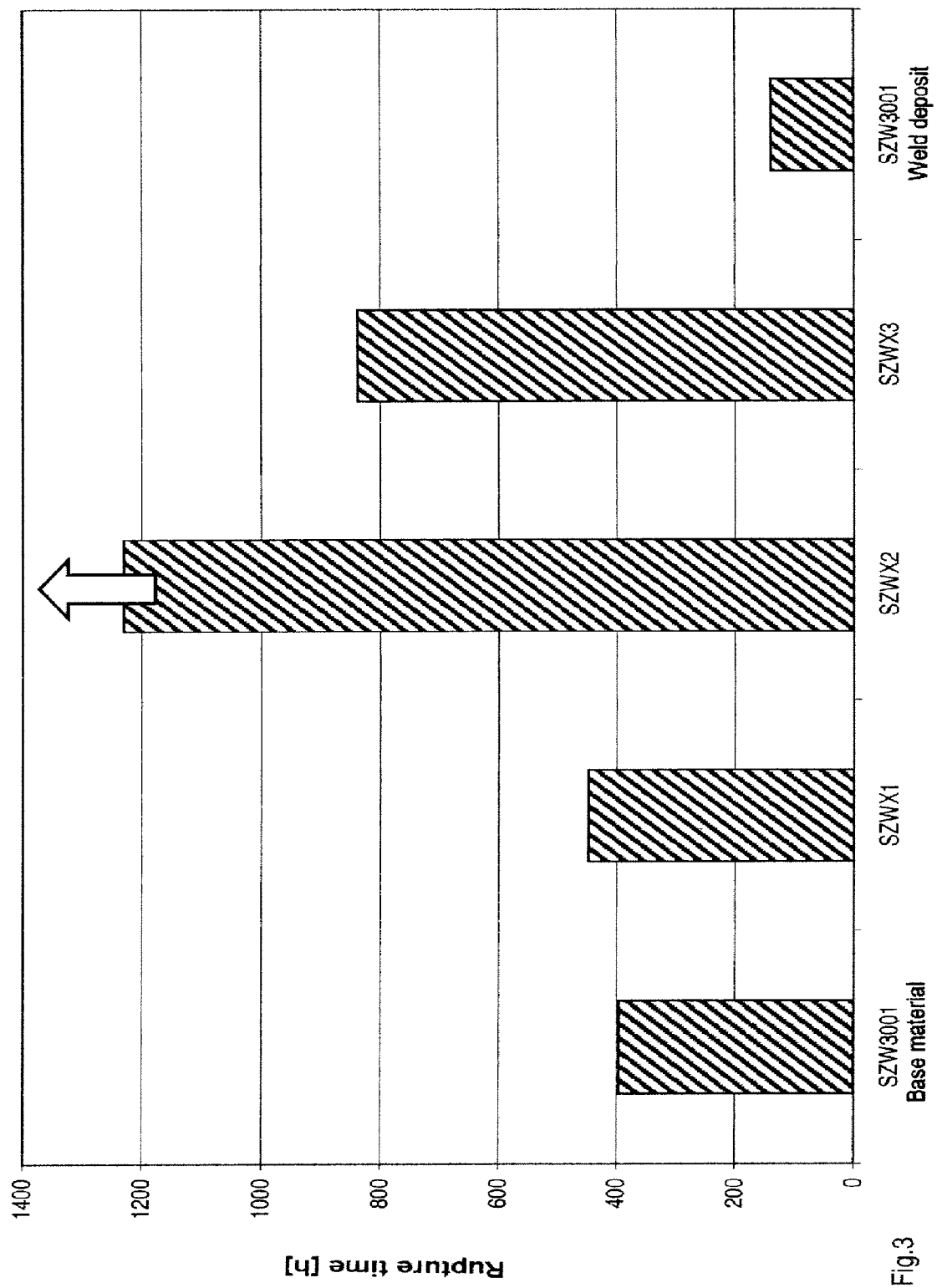
FIG. 3 shows the rupture time at 600° C./160 MPa as a bar chart for the alloys investigated.

FIG. 3 shows the creep rupture behavior. This shows the rupture time at 600° C. under a loading of 160 MPa as a bar chart for the materials investigated. All of the alloys investigated advantageously have significantly better creep rupture strengths than the alloy SZW 3001 known from the prior art. The clearest reflection of this advantage can be seen in the case of the alloy SZWX2. The specimen made from this material has not yet ruptured even after more than 1200 hours, as indicated by the arrow in FIG. 3.

These very good properties are achieved by the indicated combinations of the various alloying elements. The alloy SZWX2, in particular, has an outstanding combination of properties. This can largely be attributed to the fact that this alloy, in addition to the constituents of the welding additive material SZW 3001 known from the prior art, additionally also contains 3% by weight Re and 0.01% by weight B. Here, the rhenium acts as a very effective element for strengthening the solid solution, while boron stabilizes the carbides and reduces the coarsening thereof. Both mechanisms improve the creep rupture strength of the weld deposit.

All of the materials investigated are distinguished by a very good meltability. When a steel according to the invention is used as the welding additive material, the weld deposit therefore becomes more fluid and it is easier to carry out the welding. In addition, the oxidation resistance is advantageously increased. Therefore, materials embodying principles of the present invention are preferably used for welding gas turbine rotors.

It goes without saying that the invention is not restricted to the exemplary embodiments described.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A steel consisting of a chemical composition in percent by weight:
    0.05-0.14 C,
    8-13 Cr,
    1-2.6 Ni,
    0.5-1.9 Mo,
    0.5-1.5 Mn,
    0.15-0.5 Si,
    0.2-0.4 V,
    0-0.04 B,
    2.1-4.0 Re,
    0-0.07 Ta,
    0-max. 60 ppm Pd,
    remainder Fe and unavoidable impurities.

2. The steel as claimed in claim 1, consisting of 0.10-0.14% by weight C.

3. The steel as claimed in claim 1, consisting of 0.12% by weight C.

4. The steel as claimed in claim 1, consisting of 12% by weight Cr.

5. The steel as claimed in claim 1, consisting of 1-2.3% by weight Ni.

6. The steel as claimed in claim 1, consisting of 1% by weight Mn.

7. The steel as claimed in claim 1, consisting of 0.3-0.5% by weight Si.

8. The steel as claimed in claim 1, consisting of 0.4% by weight Si.

9. The steel as claimed in claim 1, consisting of 1.7% by weight Mo.

10. The steel as claimed in claim 1, consisting of 3.0% by weight Re.

11. The steel as claimed in claim 1, consisting of 0.005-0.2% by weight B.

12. The steel as claimed in claim 1, consisting of 0.01% by weight B.

13. The steel as claimed in claim 1, consisting of 50 ppm Pd.

14. The steel as claimed in claim 1, consisting of 0.35% by weight V.

15. The steel as claimed in claim 1, consisting of 0.01% by weight Ta.

16. A method of assembling a gas turbine rotor, the method comprising:
    providing two rotor discs; and
    welding the two rotor disc together with a material including a steel as claimed in claim 1.

17. The method as claimed in claim 16, wherein welding comprises:
    welding with said material as a welding additive material.

* * * * *